Patented June 19, 1934

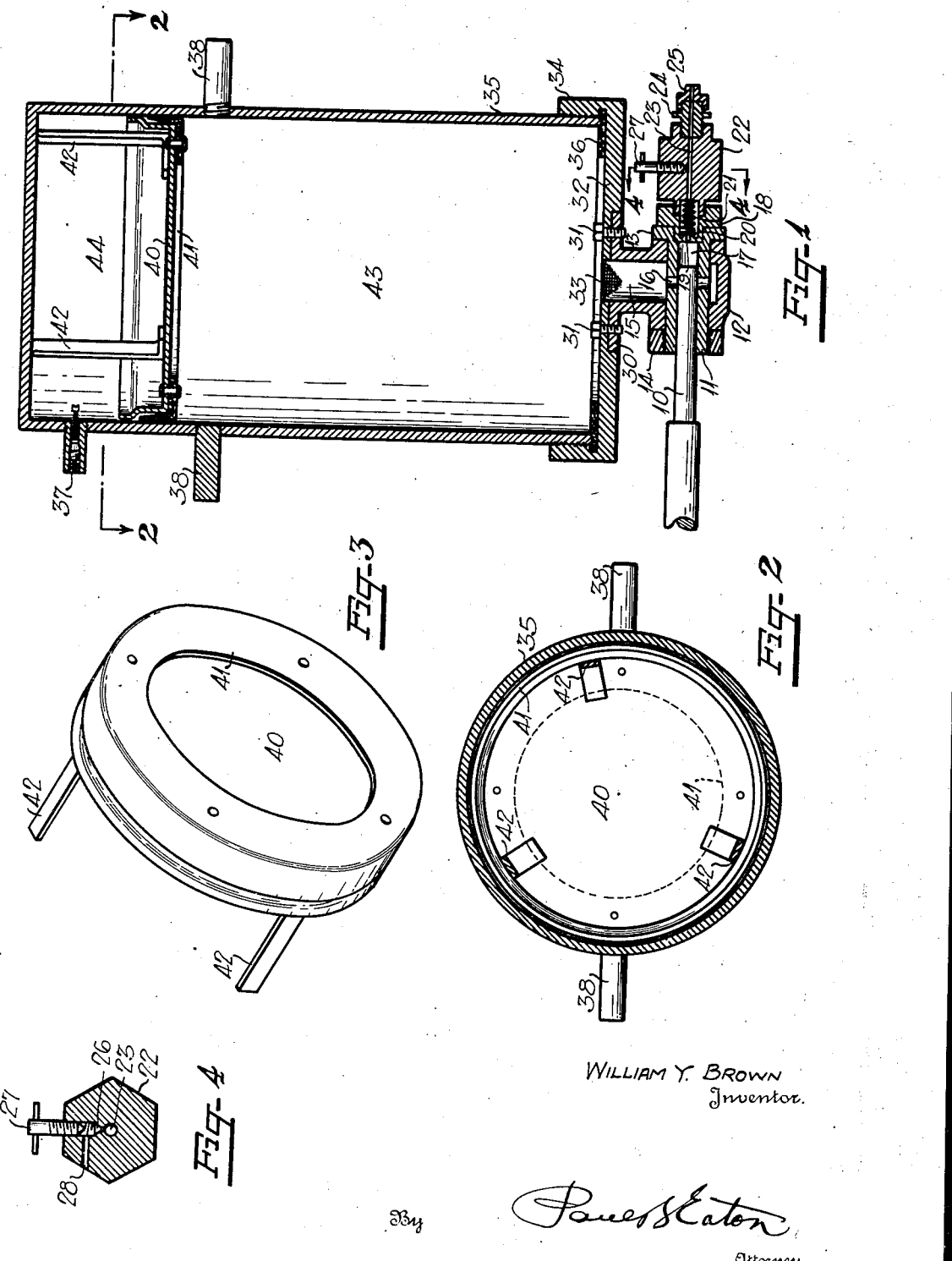

1,963,399

UNITED STATES PATENT OFFICE 1,963,399

LUBRICATION APPARATUS

William Y. Brown, Charlotte, N. C., assignor of one-third to William C. Honeycutt, Black Mountain, N. C., and one-third to Robert H. Garland, Charlotte, N. C.

Application September 9, 1933, Serial No. 688,721

2 Claims. (Cl. 221—47.1)

This invention relates to a lubricant dispenser, especially designed for the use of a heavy lubricant which will not flow satisfactorily under ordinary atmospheric pressure, and is especially adapted to form a part of the apparatus shown in my co-pending application, Serial Number 672,864, filed May 25, 1933, a portion of the structure of said co-pending application being shown herein.

Although, in said co-pending application, there is shown a portable grease gun, it is to be understood that the present invention is capable of use not only in portable grease guns, but also in all types of pressure lubrication whether stationary or portable.

In my said co-pending application, it is to be noted that there is no force to cause the lubricant to flow from the container into the pump, other than the vacuum actuated by the forcing of a charge of grease through the pump, the vacuum created pulling in another charge. I have found that in the use of thick greases having a high viscosity, such as thick greases, that such greases cannot be used satisfactorily in the structure set forth in said co-pending application.

It is, therefore, an object of this invention to provide a container for holding the grease for a force feeding lubrication apparatus, in which pressure can be applied to the grease to force it into the pump employed for forcing it to the desired points. This pressure can have various forms, but in the drawing, I have shown pneumatic pressure, though I desire it to be understood that any suitable pressure applying means can be employed for this purpose.

It is a further object of this invention to provide means for feeding a grease gun with sufficient pressure into the pump employed for forcing the grease or lubricant to the points desired to be lubricated.

Some of the objects having been stated, the invention will more fully appear when taken in connection with the accompanying drawing, in which:—

Figure 1 is a vertical section view through my apparatus, showing portions of the structure in said co-pending application with which the said invention is adapted to be associated;

Figure 2 is a transverse sectional view through my apparatus, taken along the line 2—2 in Figure 1, it being understood that line 2—2 is passed through an elevation of the apparatus instead of a vertical section;

Figure 3 is an isometric view of the slidable piston in the upper portion of Figure 1;

Figure 4 is a cross-sectional view taken along the line 4—4 in Figure 1, but showing the valve in an open position.

Referring more specifically to the drawing, the numeral 10 indicates a piston which is reciprocated by any suitable motor driven means, such as shown in my said co-pending application. This piston reciprocates in a sleeve 11 disposed in a housing 12. Sleeve 11 has an enlargement 13 on one end thereof and a nut 14 threadably engaging the other end thereof to confine it in the housing 12. Housing 12 has a vertically disposed bore 15 therein which is larger than the cross-sectional area of the sleeve 11 so that sleeve 11 has a space entirely around the central portion thereof. Sleeve 11 has radially disposed bores 16 penetrating the same and therefore crossing the bore 17 in the sleeve and in which the piston 10 reciprocates.

Threadably mounted in one end of sleeve 11 is a nut 18 having a restricted opening 19 therein normally closed by a valve 20, held in closed position by a compression spring 21, the other end of which rests in a well in a nut 22 threadably mounted in the other end of the nut 18. Nut 22 has a passageway 23 therethrough, and to the other end of nut 22 is threadable secured a fitting 24 on one end of a hose 25 for conveying the grease to the point to be lubricated, and more fully described in said co-pending application. Nut 22 has a passageway 26 in which is threadably mounted a needle valve 27, and communicating with passageway 26 is another passageway 28 through which pressure can escape when the needle valve is raised to connect the passageways 26 and 28, and shown in Figure 4.

The upper end of housing 12 has a flange 30, penetrated by stud bolts 31.

The structure thus far described is similar to the structure set forth in said co-pending application, and it is with this structure that the hereinafter described structure is adapted to co-operate.

In said co-pending application, the stud bolts 31 penetrates the bottom of the grease container and secures the same to the housing 12, but in order for the container to be removable from the bottom for replacing with another container and also for refilling purposes, the bottom 32 is made separate from the container and is penetrated by the stud bolts 31 for securing the same to the housing. Bottom 32 has a centrally disposed opening with a strainer 33 therein coinciding with the vertically disposed bore 15 in housing 12. The bottom 32 has a circular upstanding rim 34 which is threaded on the inside thereof and has a washer 36 immediately inside rim 32, against which, the lower end of the grease container 35 fits when screwed home, as the lower end of the container is threaded on the outside thereof. This permits easy removal of the container for the placing in position of another container containing a different kind of grease.

Container 35 is closed at its upper end, and near the upper end thereof is an air valve 37, similar to the type employed in pneumatic tire tubes through which compressed air may be forced into the upper end of the container.

Container 35 has a pair of handles 38 secured thereto by means of which the container can be screwed home or removed from the bottom 32.

Slidably mounted in the container 35 is a piston 40 having a washer 41 around the periphery thereof. The piston is not quite as large as the inside of the container 35 so that some air can pass thereby. The upper edge of the washer 41 is beveled on its inside edge to direct compressed air passing by piston 40 to the space between the piston and the washer whereby the pressure of the air will force the washer into contact with the sidewalls of the container 35 and form a seal. The piston 40 has a plurality of upstanding members 42 which limit the upward movement of the piston 40 and prevent its passing by the valve 37 when the container is removed from the bottom 32 and turned upside down for refilling with grease. The portion of the container disposed below the piston in Figure 1 is designated by 43, which is the grease compartment, while the compartment for the compressed air is designated by 44.

In operation, the container while removed from the bottom 32, is turned upside down from the position shown in Figure 1, and this causes the piston 40 to assume the position shown in Figure 1 on account of gravity, the valve 37 being opened to allow the air to escape from compartment 44 if necessary. The compartment 43 is filled with a lubricant, usually a very thick lubricant, and then the container is screwed home as shown in Figure 1. Then a source of compressed air is connected to the valve 37 and usually several hundred pounds of air pressure is built up in compartment 44 which forces the grease in compartment 43 towards the grease pump so that as the grease pump is operated the grease from the container which ordinarily would not flow is forced into the pump.

When the desired parts have been lubricated with one type of grease, the air pressure can be relieved and the container removed from its bottom and another similar container can be secured in position with a different type of grease and air pressure applied and the apparatus can be used for dispensing another type of grease.

It is also evident that instead of placing another container in use with a different type of grease and using compressed air, that a container such as shown in my co-pending application, can be installed and the use of compressed air dispensed with.

It is thus seen that I have devised a grease gun which can be employed with air pressure for handling thick greases, or which can be, if desired, used with an ordinary container having no compressed air chamber associated therewith.

In the drawing and specification there has been set forth a preferred embodiment of the invention and although specific terms are employed, they are used in a generic and descriptive sense only, and not for purposes of limitation, the scope of the invention being set forth in the appended claims.

I claim:

1. Lubricant dispensing apparatus comprising a pump, a housing for said pump, a circular base member secured to said housing and having a centrally disposed hole therein communicating with the pump, said base member having an upstanding flange threaded on its interior surface, a cylindrical member having its lower end threaded to threadably engage the threads on the interior of said flange, the upper end of the cylindrical member being integral with the sidewalls thereof, a pair of handles projecting from the cylindrical member, a piston mounted for sliding movement in said cylindrical member and forming a lubricant compartment in the lower end of the cylindrical member and a compressed air chamber in the upper end thereof, a valve for admitting compressed air to the air chamber, and means on the piston for limiting its upward movement to prevent its passing beyond the valve.

2. Lubricant dispensing apparatus comprising a pump, a housing for said pump, a circular base member secured to said housing and having a centrally disposed hole therein communicating with the pump, said base member having an upstanding flange threaded on its interior surface, a cylindrical member having its lower end threaded to threadadly engage the threads on the interior of said flange, the upper end of the cylindrical member being integral with the sidewalls thereof, a pair of handles projecting from the cylindrical member, a piston mounted for sliding movement in said cylindrical member and forming a lubricant compartment in the lower end of the cylindrical member and a compressed air chamber in the upper end thereof, a valve in said cylindrical member for admitting compressed air to the air chamber, said valve being disposed in the same vertical plane as one of the handles to protect it from contact with the floor when the cylindrical member is detached and placed on the floor.

WILLIAM Y. BROWN.